United States Patent
S et al.

(10) Patent No.: US 12,360,730 B2
(45) Date of Patent: Jul. 15, 2025

(54) AUDIO PROFILE CONFIGURATION VIA PROXIMITY BASED COMMUNICATIONS

(71) Applicant: QUALCOMM Incorporated, San Diego, CA (US)

(72) Inventors: Ganesh S, Hyderabad (IN); Anshul Jain, Hyderabad (IN); Himanshu Kumar Keshri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 18/061,365

(22) Filed: Dec. 2, 2022

(65) Prior Publication Data

US 2024/0184510 A1 Jun. 6, 2024

(51) Int. Cl.
*G06F 3/16* (2006.01)
*H04B 5/00* (2024.01)
*H04R 3/12* (2006.01)
*H04W 36/00* (2009.01)

(52) U.S. Cl.
CPC .............. *G06F 3/165* (2013.01); *H04B 5/00* (2013.01); *H04R 3/12* (2013.01); *H04W 36/03* (2018.08); *H04R 2420/07* (2013.01)

(58) Field of Classification Search
CPC .. G06F 3/165; H04B 5/00; H04R 3/12; H04R 2420/07; H04W 36/03
USPC ..... 381/80, 79, 77, 310, 309, 311, 307, 300; 455/31.1, 41.2, 436, 437–444; 700/94
See application file for complete search history.

(56) References Cited

U.S. PATENT DOCUMENTS

| | | | |
|---|---|---|---|
| 2007/0202807 A1 | 8/2007 | Kim | |
| 2011/0210830 A1 | 9/2011 | Talty et al. | |
| 2012/0322375 A1 | 12/2012 | Hirsch | |
| 2013/0090064 A1* | 4/2013 | Herron | H04W 88/10 455/41.2 |
| 2015/0256965 A1* | 9/2015 | Kobayashi | H04M 1/00 455/11.1 |
| 2017/0366865 A1 | 12/2017 | Hanes | |

OTHER PUBLICATIONS

International Search Report and Written Opinion—PCT/US2023/079530—ISA/EPO—Feb. 7, 2024.

* cited by examiner

*Primary Examiner* — Vivian C Chin
*Assistant Examiner* — Con P Tran
(74) *Attorney, Agent, or Firm* — Polsinelli LLP/Qualcomm Incorporated

(57) ABSTRACT

Systems and techniques are described herein for audio playback adjustment. For instance, a process can include receiving, by a first device via a proximity based communications system, an identifier associated with an audio playback device, determining that the first device has audio configuration information for the audio playback device, wherein the audio configuration information includes a set of sound effects for adjusting audio playback of the audio playback device, and transmitting, via the proximity based communications system, the audio configuration information for the audio playback device.

30 Claims, 9 Drawing Sheets

700

| User_id | Device_id | Audio_configuration |
|---|---|---|
| ****user_a1 | ***spkr_1 | Vol-30,bass-10,treble-40,no surround |
| ****user_b1 | **sound_bar1 | Vol-80,bass-80,panning ,with surround |
| ****user_a1 | **headset1 | Vol-10,bass-10,treble-60,Equalization |
| ****user_a1 | **sound_bar1 | Vol-80,bass-80,reverb-10,equalizer enable |

FIG. 7

AUDIO PROFILE CONFIGURATION VIA PROXIMITY BASED COMMUNICATIONS

FIELD

The present disclosure generally relates to wireless communication of data. For example, aspects of the present disclosure are related to systems and techniques for audio profile configuration via proximity based communications (e.g., near field communications (NFC)).

BACKGROUND

Many devices and systems allow audio data to be processed and output for consumption. Digital audio data can include large amounts of data to meet the demands of consumers. For example, consumers of audio data desire high quality audio, including high fidelity, high bit-rate, lossless, and the like. Additionally, many audio playback systems allow users to adjust how audio data is played back. This adjustment capability allows audio consumers to adjust audio playback to suit varying consumer preferences for how they want to audio to be played back. As an illustrative example, some consumers may prefer a neutral, relatively flat sound signature (e.g., frequency response) during playback. Other consumers may prefer heightened bass and/or treble response. Another consumer may prefer processed audio to widen a soundstage or to enable spatial audio.

Generally, audio playback systems that allow a user to adjust how the audio data is played back (e.g., playback settings or audio profiles) will remember the adjustments made by the user. For example, once playback settings are adjusted for an audio playback system, those playback settings are retained if the audio device is turned off and turned back on. While such audio playback systems can remember audio playback settings, such memory systems may not be effective at handling multiple users having their own audio playback settings. Techniques for audio profile configurations may thus be desired.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below Systems and techniques are described for audio playback adjustment, such as adjusting how audio may be played by a device. In one illustrative example, a method for audio playback adjustment is provided. The method includes receiving, by a first device via a proximity based communications system, an identifier associated with an audio playback device; determining that the first device has audio configuration information for the audio playback device, wherein the audio configuration information includes a set of sound effects for adjusting audio playback of the audio playback device; and transmitting, via the proximity based communications system, the audio configuration information for the audio playback device.

As another example, a method for audio playback adjustment is provided. The method includes: detecting, by an audio playback device, that a first device is in proximity with the audio playback device; transmitting, via a proximity based communications system, an identifier associated with the audio playback device; receiving, via the proximity based communications system, audio configuration information for the audio playback device, wherein the audio configuration information includes a set of sound effects for adjusting audio playback of the audio playback device; and adjusting audio playback based on the received audio configuration information In another example, an apparatus for audio playback adjustment is provided that includes at least one memory and at least one processor coupled to the at least one memory. The at least one processor is configured to: receive, via a proximity based communications system, an identifier associated with an audio playback device; determine that audio configuration information for the audio playback device is available, wherein the audio configuration information includes a set of sound effects for adjusting audio playback of the audio playback device; and transmit, via the proximity based communications system, the audio configuration information for the audio playback device.

As another example, an apparatus for audio playback is provided that includes at least one memory and at least one processor coupled to the at least one memory. The at least one processor is configured to: detect that a first device is in proximity; transmit, via a proximity based communications system, an identifier associated with the apparatus; receive, via the proximity based communications system, audio configuration information, wherein the audio configuration information includes a set of sound effects for adjusting audio playback; and adjust audio playback based on the received audio configuration information.

In another example, non-transitory computer-readable medium is provided that has stored thereon instructions that, when executed by at least one processor, cause the at least one processor to: receive, via a proximity based communications system, an identifier associated with an audio playback device; determine that audio configuration information for the audio playback device is available, wherein the audio configuration information includes a set of sound effects for adjusting audio playback of the audio playback device; and transmit, via the proximity based communications system, the audio configuration information for the audio playback device.

As another example, a non-transitory computer-readable medium is provided that has stored thereon instructions that, when executed by at least one processor, cause the at least one processor to: detect that a first device is in proximity; transmit, via a proximity based communications system, an identifier; receive, via the proximity based communications system, audio configuration information, wherein the audio configuration information includes a set of sound effects for adjusting audio playback; and adjust audio playback based on the received audio configuration information.

In another example, an apparatus for audio playback adjustment is provided. The apparatus includes: means for receiving, by a first device via a proximity based communications system, an identifier associated with an audio playback device; means for determining that the first device has audio configuration information for the audio playback device, wherein the audio configuration information includes a set of sound effects for adjusting audio playback of the audio playback device; and means for transmitting, via the proximity based communications system, the audio configuration information for the audio playback device.

As another example, an apparatus for audio playback adjustment is provided. The apparatus includes: means for detecting, by an audio playback device, that a first device is in proximity with the audio playback device; means for transmitting, via a proximity based communications system, an identifier associated with the audio playback device; means for receiving, via the proximity based communications system, audio configuration information for the audio playback device, wherein the audio configuration information includes a set of sound effects for adjusting audio playback of the audio playback device; and means for adjusting audio playback based on the received audio configuration information.

In some aspects, the apparatus comprises a mobile device (e.g., a mobile telephone or so-called "smart phone", a tablet computer, or other type of mobile device), a wearable device, an extended reality (XR) device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 7 is a table illustrating audio configuration information for multiple audio playback devices, in accordance with aspects of the present disclosure.

DETAILED DESCRIPTION

Figure 1:
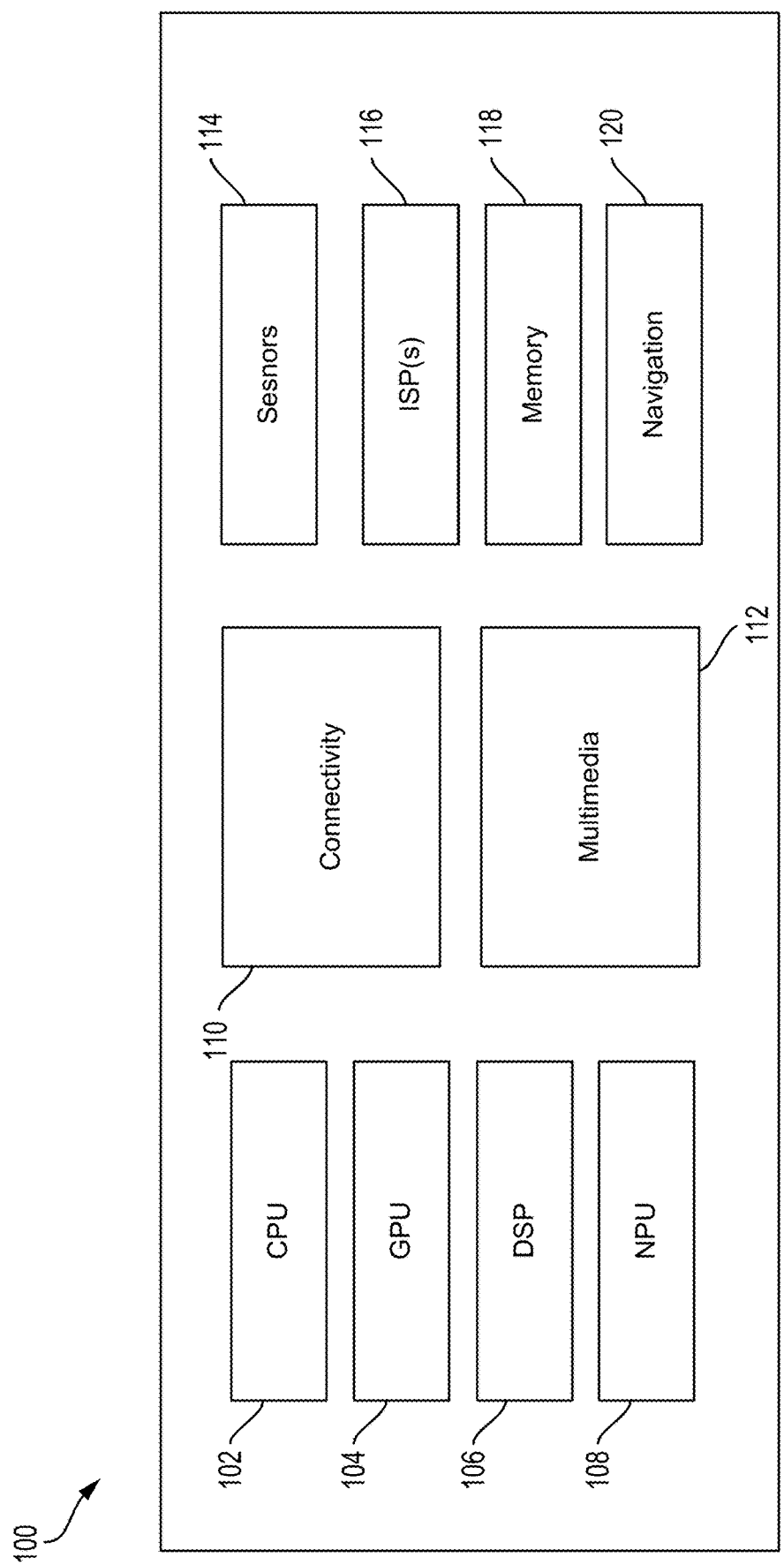
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Generally, one person may perceive audio differently from another person. For example a sound that is perceived as pleasant by one person may be perceived as grating or annoying to another person. Users may thus have particular preferences as to how they prefer audio to be played back and may want to be able to personalize the way audio is played back to them.

In some cases, sound effects (e.g., audio configuration) may be used to personalize the audio playback for a user. For example, sound effects can be used to adjust the playback of audio data to personalize the playback to their preferences. Modern audio playback devices often have a wide range of sound effects that may be adjusted, such as bass, treble, a full equalizer, volume, as well audio processing effects, such as virtual playback modes (e.g., concert hall, theater, virtual surround, etc.), spatial audio, noise cancellation, and the like. In many cases, an audio playback device will store one or more previous audio configurations (e.g., a last audio configuration) applied by a user, which can prevent the user from needing to readjust an audio configuration each time they listen to the audio playback device.

While audio playback devices can store one or more previous audio configurations (e.g., the last audio configuration), retaining the previous audio configuration(s) for later use may not work well when an audio playback device is shared by multiple users (or if a single user has multiple preferred audio configurations). For example, when a first user adjusts an audio configuration of the audio playback device, and a second user begins to use the audio playback device, the second user may not like the audio configuration applied by the first user and may want to re-adjust the audio configuration. This added friction of having to change the audio configuration when a different user uses the audio playback device may discourage usage of the shared audio playback device, or usage of user specific audio configurations.

Systems, apparatuses, electronic devices, methods (also referred to as processes), and computer-readable media (collectively referred to herein as "systems and techniques") are described herein for applying an audio configuration using a proximity based communications system. In one illustrative example, the proximity based communications system can include near field communications (NFC) system or other type of proximity based communications system. While an NFC communications system will be described herein as an illustrative example of a proximity based communications system, the systems and techniques herein can utilize other types of proximity based communications systems in some aspects.

In some cases, applying an audio configuration using NFC may allow users to easily adjust audio configurations to personalize audio playback. For example, audio configuration information may be stored on an NFC card or other NFC compatible device, such as a smartphone, tablet, extended reality (XR) device (e.g., a virtual reality (VR) device, an augmented reality (AR) device, or a mixed reality (MR) device), or other device. The stored audio configuration information may be provided to an audio playback device using NFC when the NFC card or device is brought into close proximity to (e.g., within a near field of a transmitter), as referred to as in proximity to, the audio playback device. The audio playback device may then apply the received audio configuration information (e.g., by adjusting the sound effects applied to audio being played back). In cases where the audio playback device and NFC device also include other short range connectivity capability via a radio access technology (e.g., Bluetooth™ connectivity), the audio playback device and NFC device may be paired for the short range connectivity radio access technology (e.g., Bluetooth™ connectivity) along with receiving the audio configuration information.

Various aspects of the present disclosure will be described with respect to the figures. Aspects of the disclosure are initially described in the context of a multimedia system. Specific examples are then described of devices and media processing systems that segmentation mask extrapolation. Aspects of the disclosure are further illustrated by and described with reference to apparatus diagrams, system diagrams, and flowcharts that relate to segmentation mask extrapolation.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, NFC connectivity, and the like, and a multimedia processor 112 that may, for example, encode, decode, and/or transcode digital audio data and/or output audio. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. SOC 100 and/or components thereof may be configured to perform segmentation mask extrapolation. For example, the CPU 102, DSP 106, and/or GPU 104 may be configured to perform segmentation mask extrapolation by instructions included in a software application stored at least in part on memory block 118.

Figure 2:
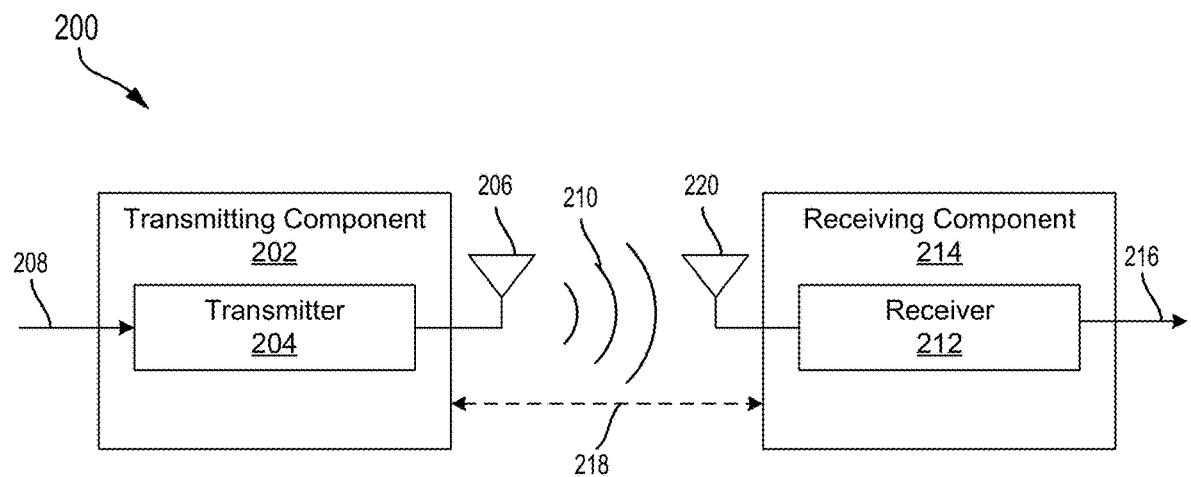
FIG. 2 depicts a wireless communications system configured for proximity based communications (e.g., near field communications (NFC)), in accordance with aspects of the present disclosure.

FIG. 2 depicts a wireless communications system 200 configured for near field communications (NFC), in accordance with aspects of the present disclosure. NFC may be considered a proximity based communications system as a NFC transmitter and receiver communicate via near field radio frequency and can only operate at short ranges (e.g., within a near field of the transmitter). The wireless communications system 200 includes a transmitting component 202, which may be a component or block of a device, such as connectivity block 110 of FIG. 1, that includes a transmitter 204 coupled to an antenna 206.

In the wireless communications system 200, input power 208 may be provided to the transmitter 204 for generating a radiated field 210 for providing energy transfer. A receiver 212 of a receiving component 214 couples to the radiated field 210 and generates an output power. The input power 208 may be modulated to encode information for transmission to the receiving component 214 via the via the radiated field 210. The receiver 212 may demodulate the output power to receive the information and output 216 the received information for storing or consumption by a device (not shown) coupled to the output 216. The transmitter 204 and the receiver 212 may be separated by a distance 218. The transmitter 204 is coupled to a transmit antenna 206 for providing a means for energy transmission. The receiver 212 is coupled to a receive antenna 220 as a means for energy reception. The transmit antenna 206 and receive antenna 220 may be sized according to applications and devices associated therewith. In some cases, the transmitter 204 and receiver 212 may be configured according to a mutual resonant relationship and when the resonant frequency of receiver 212 and the resonant frequency of transmitter 204 are similar, transmission losses between the transmitter 204 and the receiver 212 may be minimal when the receiver 212 is located in a near-field of the radiated field 210. The near-field of an RF field may be a region relatively near a conductor where propagation of electromagnetic waves is interfered with.

In some cases, an efficient energy transfer occurs by coupling a large portion of the energy in the near-field of the transmitting antenna to a receiving antenna rather than propagating most of the energy in an electromagnetic wave to a far field. When in this near-field a coupling mode may be developed between the transmit antenna 206 and the receive antenna 220. The area around the antennas 206 and 220 where this near-field coupling may occur is referred to herein as a coupling-mode region.

Figure 3:
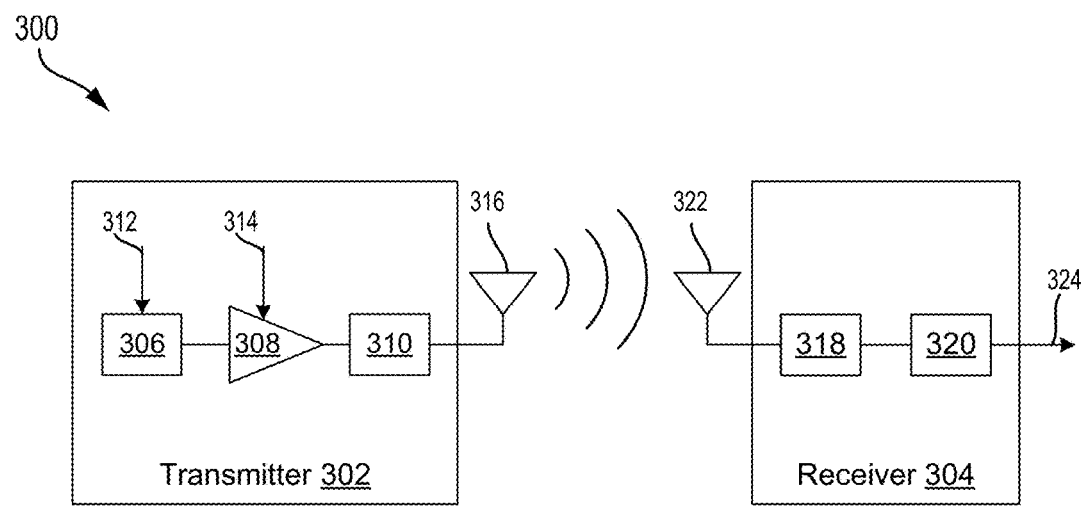
FIG. 3 is a schematic diagram of a transmitter and receiver of near field wireless communication system, in accordance with aspects of the present disclosure.

FIG. 3 is a schematic diagram of a transmitter 302 and receiver 304 of near field wireless communication system 300, in accordance with aspects of the present disclosure. The transmitter 302 includes an oscillator 306, a power amplifier 308 and a filter and matching circuit 310. The oscillator 306 may be configured to generate a signal at a desired frequency, which may be adjusted in response to adjustment signal 312. The oscillator signal may be amplified by the power amplifier 308 with an amplification amount responsive to control signal 314. The filter and matching circuit 310 may be included to filter out harmonics or other unwanted frequencies and match the impedance of the transmitter 302 to transmit antenna 316.

The receiver 304 may include a matching circuit 318 coupled to a receive antenna 322 and a rectifier and switching circuit 320 to generate an output 324. The matching circuit 318 may be included to match the impedance of the receiver 304 to the receive antenna 322.

Figure 4:
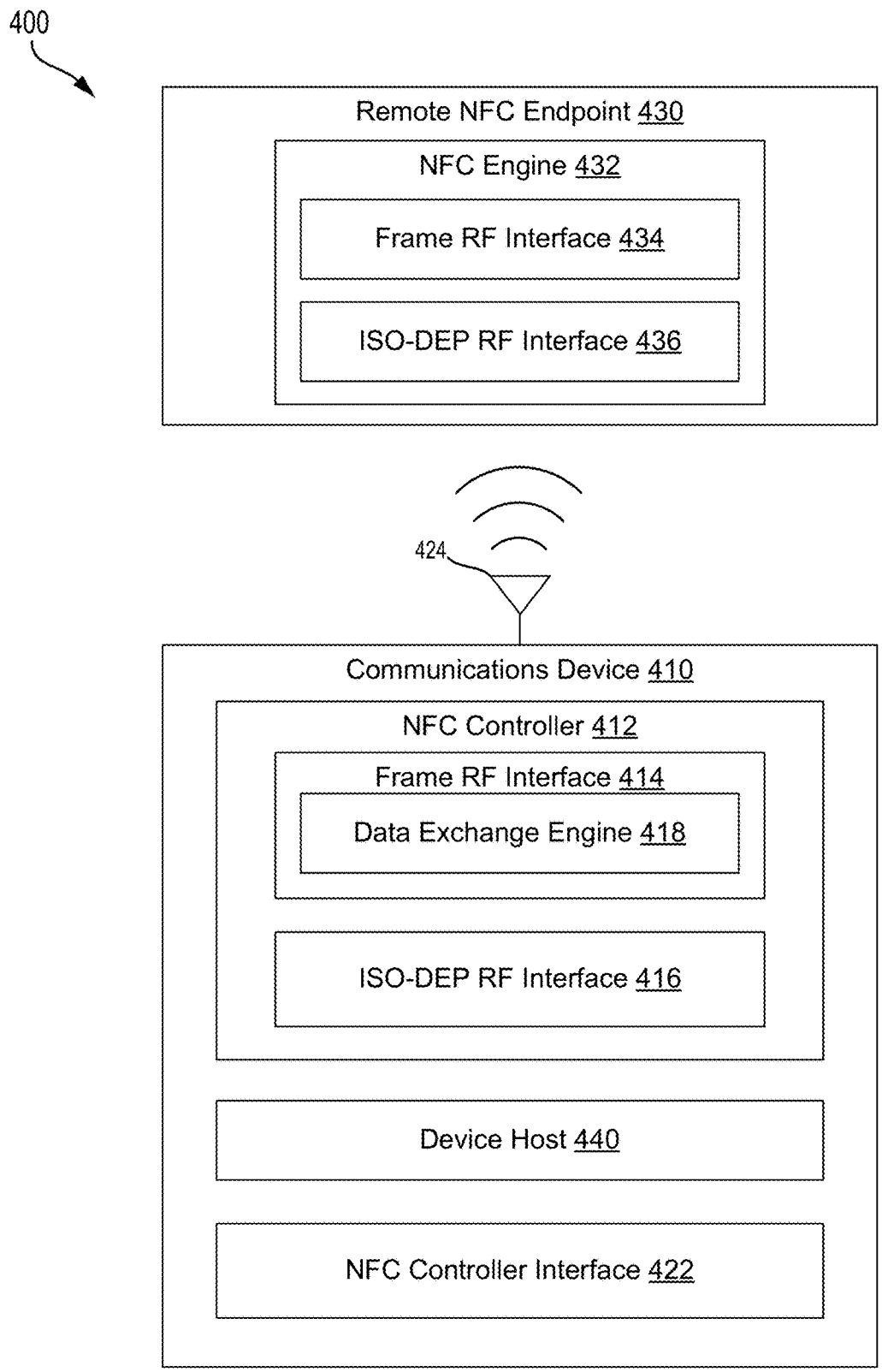
FIG. 4 is a block diagram of components for an example communication network, in accordance with aspects of the present disclosure.

FIG. 4 is a block diagram 400 of components for an example communication network, in accordance with aspects of the present disclosure. In diagram 400, a communications device 410 may be in communication, via antenna 424, with a remote NFC endpoint 430 using one or more NFC technologies (e.g., NFC-A, NFC-B, NFC-F, ISO-DEP, etc.). The remote NFC endpoint may be an NFC transceiver. Remote NFC endpoint 430 may include an NFC engine 432 for communicating through various interfaces, such as frame RF interface 434 and ISO-DEP RF interface 436. In some cases, communications device 410 and remote NFC endpoint 430 may establish an ISO-DEP communication link using an ISO-DEP RF protocol.

The communications device 410 may include an NFC controller 412, a device host 440, and an NFC controller interface (NCI) 422. In some cases, the device host 440 may be operable to obtain, through NCI 422 and NFC controller 412, information from remote NFC endpoint 430, through remote NFC endpoint 430 NFC engine 432.

The NFC controller 412 may include a frame RF interface 414 and an ISO-DEP RF interface 416. The frame RF interface 414 may include a data exchange engine 418. In some cases, during ISO-DEP communications NFC controller 412 may operate using an ISO-DEP RF interface 416. When operating using the ISO-DEP RF interface 416, NFC controller 412 may be operable to change various parameters associated with data exchange between device host 440 and remote NFC endpoint 430 using data exchange engine 418. In some cases, data may be exchanged between the communications device 410 and the remote NFC endpoint 430 using an NFC exchange format (NDEF).

Figure 5:
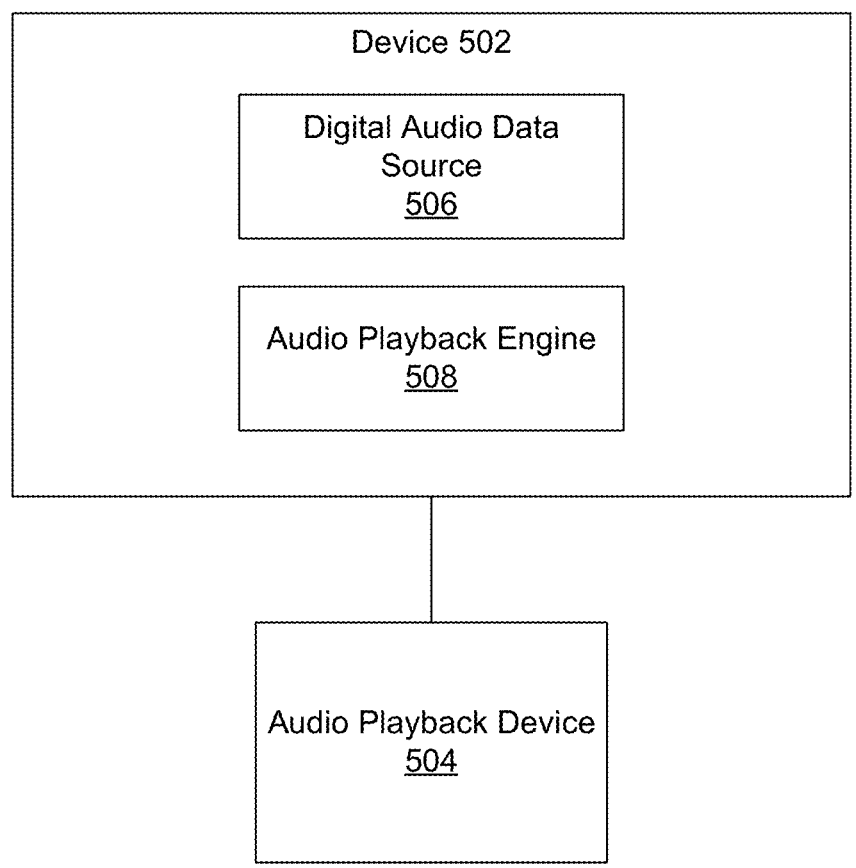
FIG. 5 is a block diagram of an audio playback system, in accordance with aspects of the present disclosure.

FIG. 5 is a block diagram of an audio playback system 500, in accordance with aspects of the present disclosure. Audio playback system 500 may include a device 502 coupled to an audio playback device 504. In some cases, device 502 may be any device capable of processing audio data and causing playback of the audio data such as a mobile device, a wearable device, an extended reality device (e.g., a virtual reality (VR) device, an augmented reality (AR) device or a mixed reality (MR) device), a personal computer, a laptop computer, a video server, a vehicle, and the like. Audio playback device 504 may be any device capable of reproducing audio such as a speaker, audio system, network connected speaker, headphones, earbuds, soundbar, and the like. In some cases, the device 502 may include a digital audio data source 506 and an audio playback engine 508. The digital audio data source 506 provides the digital audio data for playback. Examples of the digital audio data source 506 include locally stored audio data, such as audio data stored in memory 116 of FIG. 1, or digital audio data streamed to the device 502, such as from a network server, streaming audio service, or other networked device. The audio playback engine 508 may receive the digital audio data from the digital audio data source 506 and convert digital audio data from a storage format to another format compatible with the audio playback device 504. For example, the audio playback engine 508 may convert the digital data to an analog waveform for playback on a speaker. In another example, the audio playback engine 508 may convert the digital data from the storage format, such as a .mp3 format, to another digital data format, such as a Bluetooth audio format, for streaming to a Bluetooth audio device. In some cases, the audio playback engine 508 may also apply one or more transformations to the audio data. These transformations may adjust sound effects (e.g., how the audio data is played back). Examples of these sound effects may include, but are not limited to, adjusting equalizer settings, adding bass emphasis, loudness/volume adjustments, adding effects, spatializing the audio, and the like.

In some cases, these sound effects (e.g., audio configuration) may be used to personalize the audio playback for a user. For example, a user may be able to adjust the audio configuration of the audio data to adjust the playback of the audio data to their preferences. Thus, a first user may adjust the audio configuration to add bass and increase the volume, while a second user may adjust the audio configuration to help achieve a flatter audio profile with spatial audio effects added to help virtually localize audio playback to a location about the second user. In another example, a single user may have multiple audio playback devices, such as a headset and earbuds, but may prefer a different audio configuration for the headset as compared to the earbuds.

While audio playback device may be able to remember a last audio configuration applied, in audio playback devices shared by multiple systems (or if a single user has multiple preferred audio configurations), when a first user adjusts the audio configuration of the audio playback, a second user may not like the audio configuration applied and may want to adjust the audio configuration again. This added friction of having to change the audio configuration when a different user uses the audio playback device may discourage usage of the shared audio playback device, or usage of user specific audio configurations. In some cases, applying an audio configuration using NFC may allow users to easily adjust audio configurations to personalize audio playback.

In some cases, audio configuration information may be stored on an NFC card or other NFC compatible device, such as a smartphone, tablet, etc., and this audio configuration information may be provided to an audio playback device using NFC when the NFC card or device is brought into close proximity (e.g., within a near field of a transmitter). The audio playback device may then apply the received audio configuration information (e.g., by adjusting the sound effects applied to audio being played back). In cases where the audio playback device and NFC device also include an additional radio access technology (e.g., Bluetooth™ connectivity), the audio playback device and NFC device may be paired for the radio access technology (e.g., Bluetooth™ connectivity) along with receiving the audio configuration information. The audio configuration information may include one or more sound effects for adjusting audio playback of the audio playback device.

Figure 6:
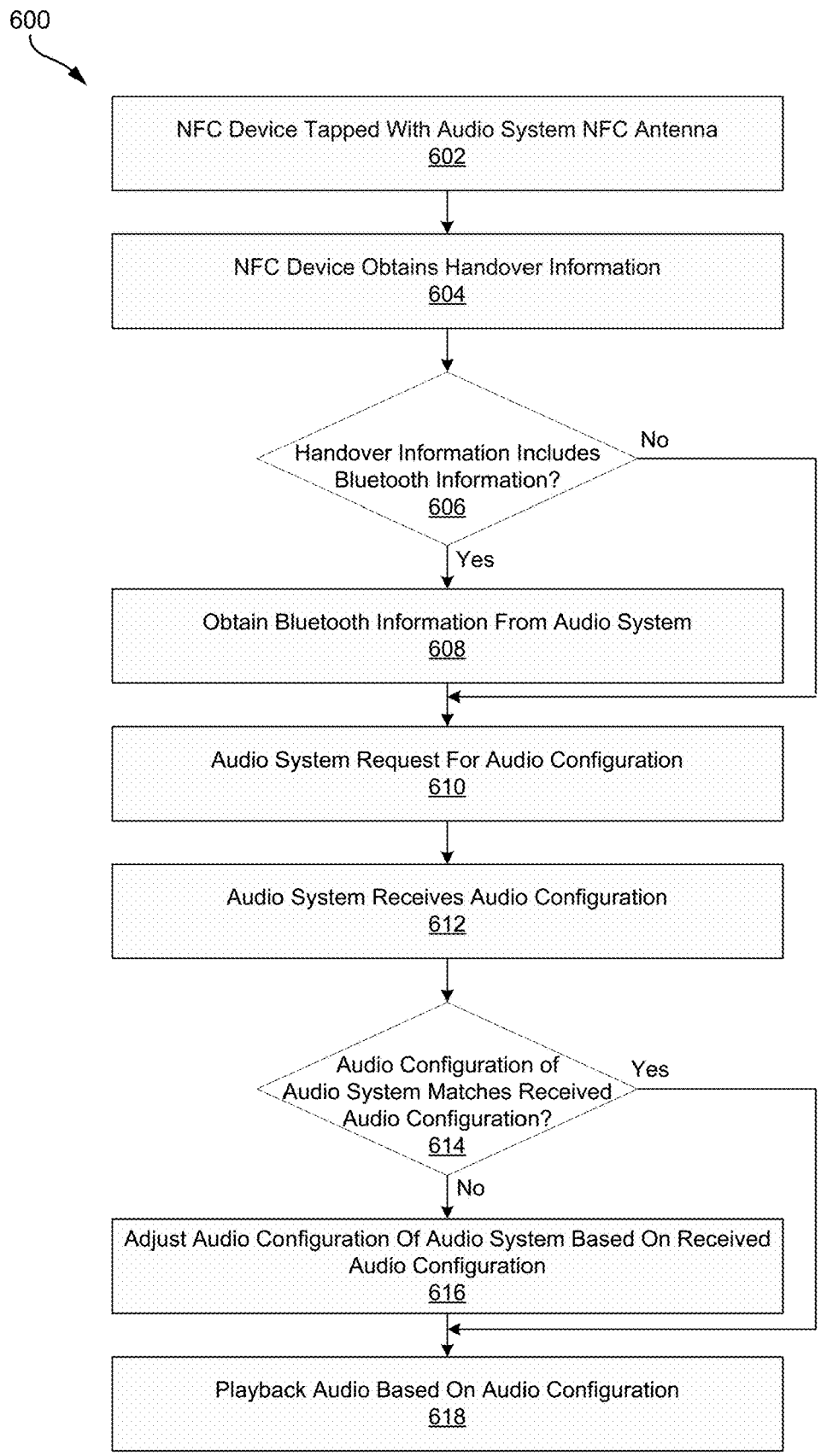
FIG. 6 is a flow diagram illustrating a process for audio profile configuration using near field communications, in accordance with aspects of the present disclosure.

FIG. 6 is a flow diagram 600 illustrating a process for audio profile configuration using near field communications, in accordance with aspects of the present disclosure. In some cases, a user may have an NFC device, such as an NFC enabled mobile phone, NFC enabled tablet, NFC card, etc., that includes one or more audio configurations for an audio playback device. In some cases, an audio configuration of the one or more audio configurations may be a default or common audio configuration that may be applied to one or more audio playback devices. In some cases, audio configurations of the one or more audio configurations may be specific to certain audio playback devices.

At block 602, an NFC device may be tapped against an NFC antenna of an audio playback device. Bringing an NFC antenna of the NFC device into close proximity (e.g., within a near field of the NFC antennas) to an NFC antenna of the audio playback device may initiate NFC transactions between the NFC device and the audio playback device. For example, the NFC device may detect that the NFC device has been brought into proximity with another NFC device (e.g., the audio playback device). At block 604, the NFC device may obtain handover information. For example, the NFC device may attempt to perform a handover operation to obtain Bluetooth pairing information (or other radio access technology pairing) from the audio playback device. In some cases, the audio playback device may be an active NFC device (e.g., an NFC device as opposed to a static NFC tag) and the NFC device may perform a negotiated handover by requesting handover information from the audio playback device. In some cases, the handover information may include information about the audio playback device, such as an identifier (e.g., MAC_ID) and/or an indication that the audio playback device supports audio profile configuration via NFC.

At block 606, if the handover information includes Bluetooth information, execution may proceed to block 608 where Bluetooth information may be obtained from the audio playback device. For example, the audio playback device may respond to the handover request with a handover select message indicating one or more alternative radio access technologies (e.g., Bluetooth, Wi-Fi, etc.) the audio playback device supports handing over to. Where the audio playback device indicates that the audio playback device supports handover to Bluetooth, the NFC device may request Bluetooth information for pairing the devices. After the Bluetooth information is obtained, execution may proceed to block 610.

At block 606, if the handover information does not include Bluetooth information, execution may proceed to block 610. For example, if the audio playback device does not support handover to Bluetooth, the audio playback device may send a handover select message indicating that the audio playback device does not support Bluetooth. In some cases, if the audio playback device does not support handover to Bluetooth, the audio playback device may not directly respond to the handover request from the NFC device. In some cases, the audio playback device may send a request for information from the NFC system instead of a direct response to the handover request. In some cases, the request for information may include information about the audio playback device, such as an identifier (e.g., MAC_ID) and/or an indication that the audio playback device supports audio profile configuration via NFC.

At block 610, the NFC system may request audio configuration information from the NFC device. For example, the audio playback device may request NDEF information from the NFC device via the NFC connection. In some cases, the request may indicate that the request is for audio configuration information. In some examples, the audio configuration request may include identification information for the audio playback device. The NFC device may respond to the request for audio configuration information by sending the audio configuration information. In some cases, the audio configuration information may be generic or default audio configuration information that may be applied to multiple audio playback devices. In other cases, the audio configuration information may be specific to a particular audio playback device. For example, the audio configuration request may include identification information for the audio playback device and the NFC device may retrieve audio configuration information based on the identification information.

In some cases, the audio configuration information may be transferred via the NFC connection instead of Bluetooth (if available) because Bluetooth may automatically connect to a last connected device, or a unpair/pair operation may be performed to connect Bluetooth to a different audio source (e.g., the NFC system). With NFC, both a Bluetooth pairing operation and transfer of audio configuration information may be performed with a single action from a user (e.g., tapping), which may streamline a user experience for the user.

At block 612, the audio playback device may receive the audio configuration information. For example, the audio playback device may receive the NDEF information from the NFC device including the audio configuration information. At block 614, the audio playback device may compare the received audio configuration information to a current audio configuration of the audio playback device. If the received audio configuration information does not match the current audio configuration of the audio playback device, execution may proceed to block 616. At block 616, the current audio configuration of the audio playback device may be adjusted based on the received audio configuration. In some cases, the audio configuration may include configurations that may not be supported by the audio playback device. For example, if the received audio configuration indicates that an enhanced bass feature should be activated, but the audio playback device does not support the enhanced bass feature. In such cases, the particular configuration may be ignored. In some cases, the audio playback device may prompt the user, either visually via a display, or via one or more audio prompts, if certain audio configurations could not be applied, were not successfully applied, or were successfully applied. In some cases, the audio playback device may be configured to adjust another feature as a best fit for a feature that is not supported. Extending the example above, if the audio playback device does not support the enhanced bass feature, but the audio playback device does support an equalizer setting, the audio playback device may adjust the equalizer setting to increase bass for audio playback. The exact feature adjusted as a best fit, exact setting for such best fit features, and how to handle potentially conflicting features (e.g., a received audio configuration activating enhanced bass, along with an equalizer configuration decreasing bass) may be implementation specific and vary from audio playback device to audio playback device. After adjustment of the audio configuration, execution may proceed to block 618 where audio may be played back based on the current audio configuration.

At block 614, if the comparison between the received audio configuration information and the current audio configuration of the audio playback device indicates that the received audio configuration information and the current audio configuration matches, execution may proceed to block 618 where audio may be played back based on the current audio configuration. In cases where the Bluetooth information is obtained from the audio system at block 608, a handover operation may be performed to establish a Bluetooth connection (e.g., pairing). In such cases, the audio configuration information may be transmitted via NFC.

As indicated above, in some cases, audio configuration information may be specific to a particular audio playback device. FIG. 7 is a table 700 illustrating audio configuration information for multiple audio playback devices, in accordance with aspects of the present disclosure. In some cases, an NFC device may have multiple users and these multiple users may have audio configuration information specified for one or more audio playback devices. For example, table 700 may be associated with an NFC device having two users, user_a1 and user_b1. User_b1 may have a single audio configuration for an audio playback device with a device identifier sound_bar1. When the NFC device is being used by (e.g., being used with an account associated with user_b1) user_b1 and tapped with audio playback device sound_bar1, the NFC device may transfer audio configuration information corresponding to user_b1 and sound_bar1, here Vol-80, bass-80, panning, with surround, to sound_bar1. As indicated above, the device identifier may correspond with NFC identification information for the audio playback device. Similarly, a single user, such as user_a1, may have audio configuration information for multiple audio playback devices and which audio configuration information may be transferred may be based on the NFC identification information for the audio playback device. In some cases, audio configuration information may be updated, for example, using an application executing on the NFC device (e.g., an app running on a smartphone), or the audio configuration information may be updated by the audio playback device via a separate NFC communication (e.g., another tap procedure) that is outside of a scope of this disclosure. The NFC device may store the audio configuration information for the multiple users for use with audio playback devices and the audio configuration information may be stored using any data format in a storage device of the NFC device.

Figure 8:
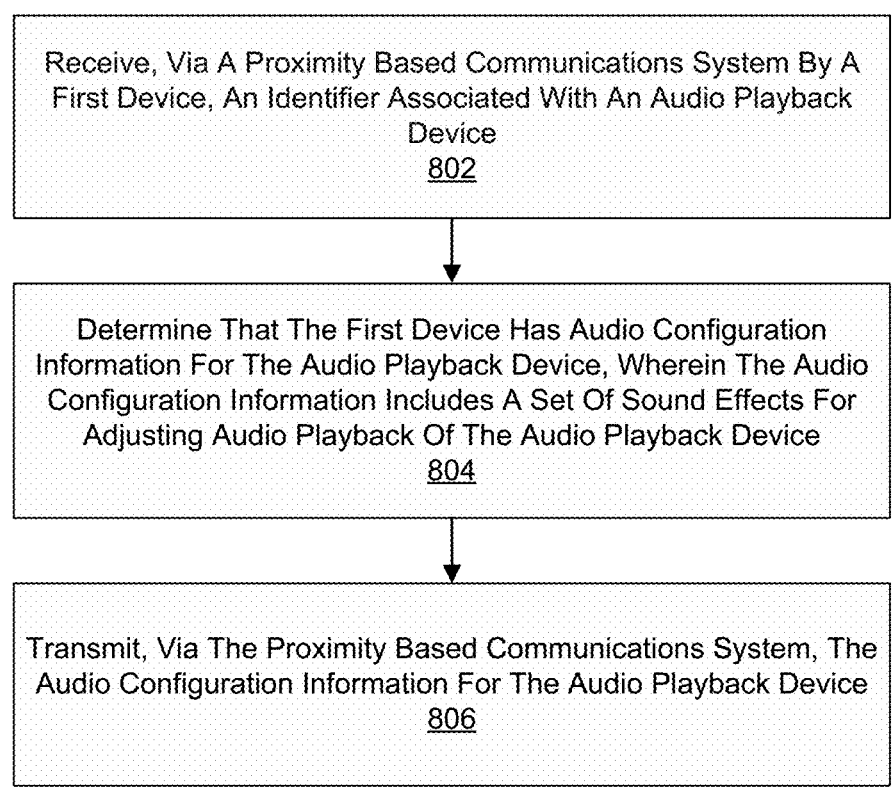
FIG. 8 is a flow diagram illustrating a process for audio playback adjustment by an audio playback device, in accordance with aspects of the present disclosure.

FIG. 8 is a flow diagram illustrating a process 800 for audio playback adjustment, in accordance with aspects of the present disclosure. The process 800 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 800 may be implemented as software components that are executed and run on one or more processors.

At block 802, the computing device (or component thereof) may receive, via a proximity based communications system (e.g. the wireless communications system 200 of FIG. 2), an identifier associated with an audio playback device. In some cases, the proximity based communications system includes a near field communications system. In some cases, the computing device (or component thereof) may transmit, via the proximity based communications system, a request for handover information from the audio playback device, wherein the handover information comprises information for establishing a connection via a radio access technology. The computing device (or component thereof) may receive, via the proximity based communications system, handover information from the audio playback device. The computing device (or component thereof) may perform a handover operation using the handover information. In some cases, the radio access technology includes a Bluetooth radio access technology, and the handover operation comprises a Bluetooth pairing operation.

At block 804, the computing device (or component thereof) may determine that audio configuration information for the audio playback device is available. The audio configuration information may include a set of sound effects for adjusting audio playback of the audio playback device. In some cases, the computing device (or component thereof) may determine that the audio configuration information for the audio playback device is available by determining that the apparatus has a default audio configuration for audio playback devices. In some cases, the computing device (or component thereof) may receive identification information from the audio playback device. The computing device (or component thereof) may determine that the computing device has audio configuration information for the audio playback device based on the received identification information. In some cases, the computing device (or component thereof) may receive an indication that the audio playback device can receive audio configuration information.

At block 806, the computing device (or component thereof) may transmit, via the proximity based communications system, the audio configuration information for the audio playback device.

Figure 9:
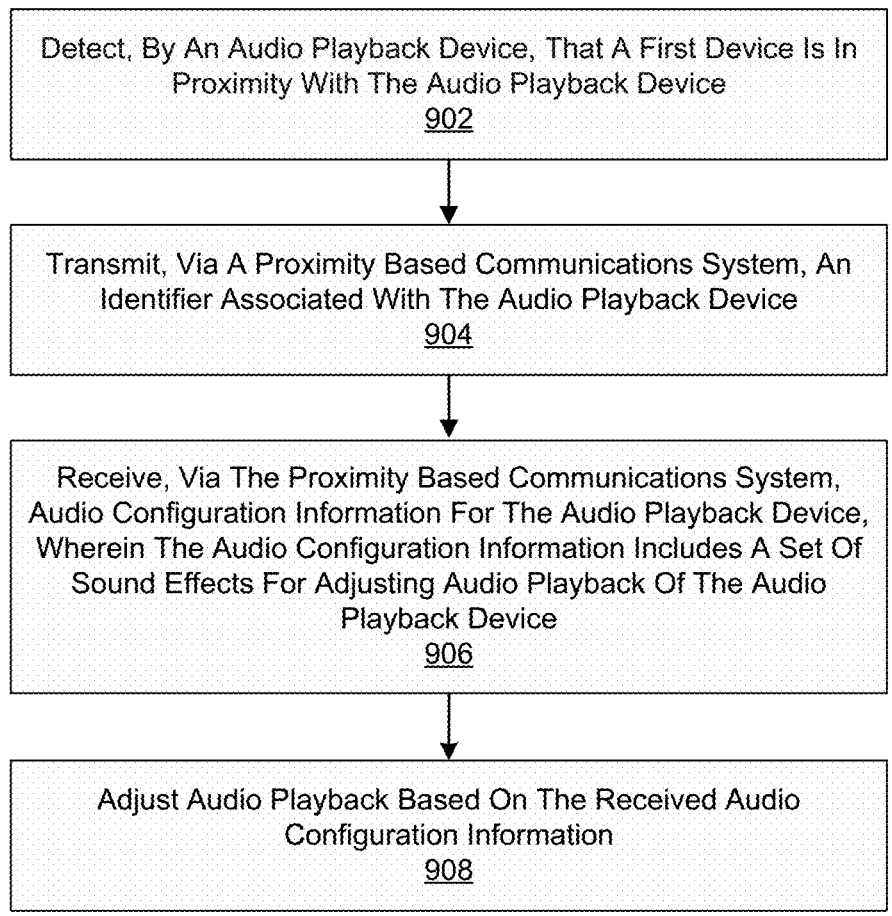
FIG. 9 is a flow diagram illustrating a process for audio playback adjustment by an audio playback device, in accordance with aspects of the present disclosure.

FIG. 9 is a flow diagram illustrating a process 900 for audio playback adjustment, in accordance with aspects of the present disclosure. The process 900 may be performed by a an audio playback device (e.g., audio playback device 504) or a component (e.g., a chipset, codec, etc.) of the audio playback device. The audio playback device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 900 may be implemented as software components that are executed and run on one or more processors.

At block 902, the audio playback device (or component thereof) may detect that a first device is in proximity to the audio playback device.

At block 904, the audio playback device (or component thereof) may transmit, via a proximity based communications system, an identifier associated with the audio playback device. In some cases, the proximity based communications system comprises a near field communications system. In some cases, the audio playback device (or component thereof) may receive, via the proximity based communications system, a request for handover information. For example, the handover information may include information for establishing a connection via a radio access technology. The audio playback device (or component thereof) may transmit, via the proximity based communications system, handover information. The audio playback device (or component thereof) may perform a handover operation. In some cases, the radio access technology includes a Bluetooth radio access technology, and the handover operation may include a Bluetooth pairing operation. In some cases, the audio playback device (or component thereof) may transmit identification information to the first device. In some cases, the audio playback device (or component thereof) may transmit an indication that the apparatus can receive audio configuration information.

At block 906, the audio playback device (or component thereof) may receive, via the proximity based communications system, audio configuration information. The audio configuration information may include a set of sound effects for adjusting audio playback. In some cases, the audio playback device (or component thereof) may receive the audio configuration information. The audio playback device (or component thereof) may determine that a sound effect corresponding to one or more sound effects in the received audio configuration information cannot be adjusted. The audio playback device (or component thereof) may further determine an additional sound effect that may be adjusted. The audio playback device (or component thereof) may adjust the additional sound effect based on the sound effect in the received audio configuration information. In some cases, the audio playback device (or component thereof) may receive the audio configuration information and determine that a sound effect corresponding to one or more sound effects in the received audio configuration information cannot be adjusted based on the sound effect in the received audio configuration information. The audio playback device (or component thereof) may provide an indication that the one or more sound effects cannot be adjusted based on the sound effect in the received audio configuration information At block 908, the audio playback device (or component thereof) may adjust audio playback based on the received audio configuration information.

Figure 10:
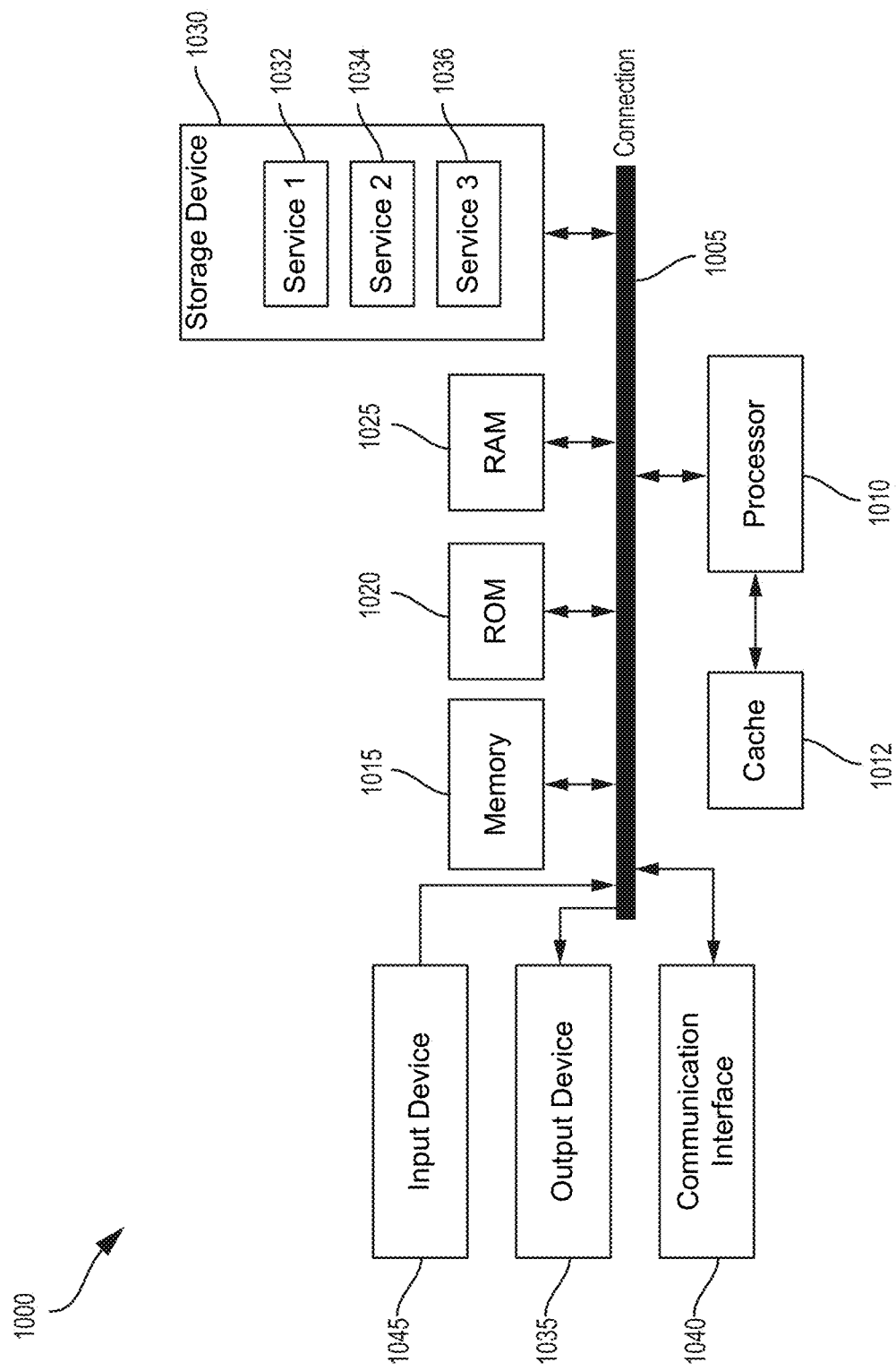
FIG. 10 illustrates an example computing device architecture of an example computing device which can implement the various techniques described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1000 may include SOC 100 of FIG. 1. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other modules can control or be configured to control processor 1010 to perform various actions. Other computing device memory 1015 may be available for use as well. Memory 1015 can include multiple different types of memory with different performance characteristics. Processor 1010 can include any general purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors or other suitable electronic circuits) to perform the operation, or any combination thereof.

The phrase "coupled to" refers to any component that is physically connected to another component either directly or indirectly and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for audio playback adjustment, the method comprising: receiving, by a first device via a proximity based communications system, an identifier associated with an audio playback device; determining that the first device has audio configuration information for the audio playback device, wherein the audio configuration information includes a set of sound effects for adjusting audio playback of the audio playback device; and transmitting, via the proximity based communications system, the audio configuration information for the audio playback device.

Aspect 2. The method of aspect 1, wherein the proximity based communications system comprises a near field communications system.

Aspect 3. The method of any of aspects 1-2, further comprising: transmitting, via the proximity based communications system, a request for handover information from the audio playback device, wherein the handover information comprises information for establishing a connection via a radio access technology; receiving, via the proximity based communications system, handover information from the audio playback device; and performing a handover operation using the handover information.

Aspect 4. The method of aspect 3, wherein the radio access technology includes a Bluetooth radio access technology, and wherein the handover operation comprises a Bluetooth pairing operation.

Aspect 5. The method of any of aspects 1-4, wherein determining that the first device has audio configuration information for the audio playback device comprises determining that the first device has a default audio configuration for audio playback devices.

Aspect 6. The method of aspect 5, further comprising: receiving identification information from the audio playback device, wherein determining that the first device has audio configuration information for the audio playback device is based on the received identification information.

Aspect 7. The method of any of aspects 1-6, further comprising receiving an indication that the audio playback device can receive audio configuration information.

Aspect 8. A method for audio playback adjustment, the method comprising: detecting, by an audio playback device, that a first device is in proximity with the audio playback device; transmitting, via a proximity based communications system, an identifier associated with the audio playback device; receiving, via the proximity based communications system, audio configuration information for the audio playback device, wherein the audio configuration information includes a set of sound effects for adjusting audio playback of the audio playback device; and adjusting audio playback based on the received audio configuration information.

Aspect 9. The method of aspect 8, wherein the proximity based communications system comprises a near field communications system.

Aspect 10. The method of any of aspects 8-9, further comprising: receiving, via the proximity based communications system, a request for handover information from the audio playback device, wherein the handover information comprises information for establishing a connection via a radio access technology; transmitting, via the proximity based communications system, handover information from the audio playback device; and performing a handover operation.

Aspect 11. The method of aspect 10, wherein the radio access technology includes a Bluetooth radio access technology, and wherein the handover operation comprises a Bluetooth pairing operation.

Aspect 12. The method of any of aspects 8-11, further comprising transmitting identification information to the first device.

Aspect 13. The method of any of aspects 8-12, further comprising transmitting an indication that the audio playback device can receive audio configuration information.

Aspect 14. The method of aspect 13, further comprising: receiving the audio configuration information; determining that a sound effect corresponding to one or more sound effects in the received audio configuration information cannot be adjusted; determining an additional sound effect that may be adjusted; and adjusting the additional sound effect based on the sound effect in the received audio configuration information.

Aspect 15. The method of aspect 13, further comprising: receiving the audio configuration information; determining that a sound effect corresponding to one or more sound effects in the received audio configuration information cannot be adjusted based on the sound effect in the received audio configuration information; and providing an indication that the one or more sound effects cannot be adjusted based on the sound effect in the received audio configuration information.

Aspect 16. An apparatus for audio playback adjustment, the apparatus comprising: at least one memory; and at least one processor coupled to the at least one memory, the at least one processor being configured to: receive, via a proximity based communications system, an identifier associated with an audio playback device; determine that audio configuration information for the audio playback device is available, wherein the audio configuration information includes a set of sound effects for adjusting audio playback of the audio playback device; and transmit, via the proximity based communications system, the audio configuration information for the audio playback device.

Aspect 17. The apparatus of aspect 16, wherein the proximity based communications system comprises a near field communications system.

Aspect 18. The apparatus of any of aspects 16-17, wherein the at least one processor is further configured to: transmit, via the proximity based communications system, a request for handover information from the audio playback device, wherein the handover information comprises information for establishing a connection via a radio access technology; receive, via the proximity based communications system, handover information from the audio playback device; and perform a handover operation using the handover information.

Aspect 19. The apparatus of aspect 18, wherein the radio access technology includes a Bluetooth radio access technology, and wherein the handover operation comprises a Bluetooth pairing operation.

Aspect 20. The apparatus of any of aspects 16-19, wherein, to determine that the audio configuration information for the audio playback device is available, the at least one processor is configured to determine that the apparatus has a default audio configuration for audio playback devices.

Aspect 21. The apparatus of aspect 20, wherein the at least one processor is further configured to: receive identification information from the audio playback device, and wherein the at least one processor is configured to determine that the apparatus has audio configuration information for the audio playback device based on the received identification information.

Aspect 22. The apparatus of any of aspects 16-21, wherein the at least one processor is further configured to receive an indication that the audio playback device can receive audio configuration information.

Aspect 23. An apparatus for audio playback, the apparatus comprising: at least one memory; and at least one processor coupled to the at least one memory, the at least one processor being configured to: detect that a first device is in proximity; transmit, via a proximity based communications system, an identifier associated with the apparatus; receive, via the proximity based communications system, audio configuration information, wherein the audio configuration information includes a set of sound effects for adjusting audio playback; and adjust audio playback based on the received audio configuration information.

Aspect 24. The apparatus of aspect 23, wherein the proximity based communications system comprises a near field communications system.

Aspect 25. The apparatus of any of aspects 23-24, wherein the at least one processor is further configured to: receive, via the proximity based communications system, a request for handover information, wherein the handover information comprises information for establishing a connection via a radio access technology; transmit, via the proximity based communications system, handover information; and perform a handover operation.

Aspect 26. The apparatus of aspect 25, wherein the radio access technology includes a Bluetooth radio access technology, and wherein the handover operation comprises a Bluetooth pairing operation.

Aspect 27. The apparatus of any of aspects 23-26, wherein the at least one processor is further configured to transmit identification information to the first device.

Aspect 28. The apparatus of aspect 23, wherein the at least one processor is further configured to transmit an indication that the apparatus can receive audio configuration information.

Aspect 29. The apparatus of aspect 28, wherein the at least one processor is further configured to: receive the audio configuration information; determine that a sound effect corresponding to one or more sound effects in the received audio configuration information cannot be adjusted; determine an additional sound effect that may be adjusted; and adjust the additional sound effect based on the sound effect in the received audio configuration information.

Aspect 30. The apparatus of aspect 28, wherein the at least one processor is further configured to: receive the audio configuration information; determine that a sound effect corresponding to one or more sound effects in the received audio configuration information cannot be adjusted based on the sound effect in the received audio configuration information; and provide an indication that the one or more sound effects cannot be adjusted based on the sound effect in the received audio configuration information.

Aspect 31. A non-transitory computer-readable medium having stored thereon instructions that, when executed by at least one processor, cause the at least one processor to: receive, via a proximity based communications system, an identifier associated with an audio playback device; determine that audio configuration information for the audio playback device is available, wherein the audio configuration information includes a set of sound effects for adjusting audio playback of the audio playback device; and transmit, via the proximity based communications system, the audio configuration information for the audio playback device.

Aspect 32. The non-transitory computer-readable medium of aspect 31, wherein the proximity based communications system comprises a near field communications system.

Aspect 33. The non-transitory computer-readable medium of any of aspects 31-32, wherein the instructions further cause the at least one processor to: transmit, via the proximity based communications system, a request for handover information from the audio playback device, wherein the handover information comprises information for establishing a connection via a radio access technology; receive, via the proximity based communications system, handover information from the audio playback device; and perform a handover operation using the handover information.

Aspect 34. The non-transitory computer-readable medium of aspect 33, wherein the radio access technology includes a Bluetooth radio access technology, and wherein the handover operation comprises a Bluetooth pairing operation.

Aspect 35. The non-transitory computer-readable medium of any of aspects 31-34, wherein, to determine that the audio configuration information for the audio playback device is available, the instructions further cause the at least one processor to determine a default audio configuration for audio playback devices.

Aspect 36. The non-transitory computer-readable medium of aspect 35, wherein the instructions further cause the at least one processor to: receive identification information from the audio playback device, and wherein the at least one processor is configured to determine that there is audio configuration information for the audio playback device based on the received identification information.

Aspect 37. The non-transitory computer-readable medium of any of aspects 31-36, wherein the instructions further cause the at least one processor to receive an indication that the audio playback device can receive audio configuration information.

Aspect 38. A non-transitory computer-readable medium having stored thereon instructions that, when executed by at least one processor, cause the at least one processor to: detect that a first device is in proximity; transmit, via a proximity based communications system, an identifier; receive, via the proximity based communications system, audio configuration information, wherein the audio configuration information includes a set of sound effects for adjusting audio playback; and adjust audio playback based on the received audio configuration information.

Aspect 39. The non-transitory computer-readable medium of aspect 38, wherein the proximity based communications system comprises a near field communications system.

Aspect 40. The non-transitory computer-readable medium of any of aspects 38-39, wherein the instructions further cause the at least one processor to: receive, via the proximity based communications system, a request for handover information, wherein the handover information comprises information for establishing a connection via a radio access technology; transmit, via the proximity based communications system, handover information; and perform a handover operation.

Aspect 41. The non-transitory computer-readable medium of aspect 40, wherein the radio access technology includes a Bluetooth radio access technology, and wherein the handover operation comprises a Bluetooth pairing operation.

Aspect 42. The non-transitory computer-readable medium of any of aspects 38-41, wherein the instructions further cause the at least one processor to transmit identification information to the first device.

Aspect 43. The non-transitory computer-readable medium of any of aspects 38-42, wherein the instructions further cause the at least one processor to transmit an indication to receive audio configuration information.

Aspect 44. The non-transitory computer-readable medium of aspect 43, wherein the instructions further cause the at least one processor to: receive the audio configuration information; determine that a sound effect corresponding to one or more sound effects in the received audio configuration information cannot be adjusted; determine an additional sound effect that may be adjusted; and adjust the additional sound effect based on the sound effect in the received audio configuration information.

Aspect 45. The non-transitory computer-readable medium of aspect 43, wherein the instructions further cause the at least one processor to: receive the audio configuration information; determine that a sound effect corresponding to one or more sound effects in the received audio configuration information cannot be adjusted based on the sound effect in the received audio configuration information; and provide an indication that the one or more sound effects cannot be adjusted based on the sound effect in the received audio configuration information.

Aspect 46: An apparatus comprising one or more means for performing operations according to any one or more of Aspects 1-15.

What is claimed is:

1. A method for audio playback adjustment, the method comprising:
    receiving, by a first device via a proximity based communications system, an identifier associated with an audio playback device;
    determining that the first device has audio configuration information for the audio playback device, wherein the audio configuration information includes a set of sound effects for adjusting audio playback of the audio playback device; and
    transmitting, via the proximity based communications system, the audio configuration information for the audio playback device based on the determination that the first device has audio configuration information for the audio playback device.

2. The method of claim 1, wherein the proximity based communications system comprises a near field communications system.

3. The method of claim 1, further comprising:
    transmitting, via the proximity based communications system, a request for handover information from the audio playback device, wherein the handover information comprises information for establishing a connection via a radio access technology;
    receiving, via the proximity based communications system, the handover information from the audio playback device; and
    performing a handover operation using the handover information.

4. The method of claim 3, wherein the radio access technology includes a Bluetooth radio access technology, and wherein the handover operation comprises a Bluetooth pairing operation.

5. The method of claim 1, wherein determining that the first device has audio configuration information for the audio playback device comprises determining that the first device has a default audio configuration for audio playback devices.

6. The method of claim 5, further comprising:
    receiving identification information from the audio playback device, wherein determining that the first device has the audio configuration information for the audio playback device is based on the received identification information.

7. The method of claim 1, further comprising receiving an indication that the audio playback device can receive the audio configuration information.

8. A method for audio playback adjustment, the method comprising:
   detecting, by an audio playback device, that a first device is in proximity with the audio playback device;
   transmitting, via a proximity based communications system, an identifier associated with the audio playback device;
   receiving, in response to the transmitted identifier and via the proximity based communications system, audio configuration information for the audio playback device, wherein the audio configuration information includes a set of sound effects for adjusting audio playback of the audio playback device; and
   adjusting audio playback based on the received audio configuration information.

9. The method of claim 8, wherein the proximity based communications system comprises a near field communications system.

10. The method of claim 8, further comprising:
    receiving, via the proximity based communications system, a request for handover information from the audio playback device, wherein the handover information comprises information for establishing a connection via a radio access technology;
    transmitting, via the proximity based communications system, the handover information from the audio playback device; and
    performing a handover operation.

11. The method of claim 10, wherein the radio access technology includes a Bluetooth radio access technology, and wherein the handover operation comprises a Bluetooth pairing operation.

12. The method of claim 8, further comprising transmitting identification information to the first device.

13. The method of claim 8, further comprising transmitting an indication that the audio playback device can receive the audio configuration information.

14. The method of claim 13, further comprising:
    receiving the audio configuration information;
    determining that a sound effect corresponding to one or more sound effects in the received audio configuration information cannot be adjusted;
    determining an additional sound effect that may be adjusted; and
    adjusting the additional sound effect based on the sound effect in the received audio configuration information.

15. The method of claim 13, further comprising:
    receiving the audio configuration information;
    determining that a sound effect corresponding to one or more sound effects in the received audio configuration information cannot be adjusted based on the sound effect in the received audio configuration information; and
    providing an indication that the one or more sound effects cannot be adjusted based on the sound effect in the received audio configuration information.

16. An apparatus for audio playback adjustment, the apparatus comprising:
    at least one memory; and
    at least one processor coupled to the at least one memory, the at least one processor being configured to:
    receive, via a proximity based communications system, an identifier associated with an audio playback device;
    determine that audio configuration information for the audio playback device is available, wherein the audio configuration information includes a set of sound effects for adjusting audio playback of the audio playback device; and
    transmit, via the proximity based communications system, the audio configuration information for the audio playback device based on the determination that the apparatus has audio configuration information for the audio playback device.

17. The apparatus of claim 16, wherein the proximity based communications system comprises a near field communications system.

18. The apparatus of claim 16, wherein the at least one processor is further configured to:
    transmit, via the proximity based communications system, a request for handover information from the audio playback device, wherein the handover information comprises information for establishing a connection via a radio access technology;
    receive, via the proximity based communications system, the handover information from the audio playback device; and
    perform a handover operation using the handover information.

19. The apparatus of claim 18, wherein the radio access technology includes a Bluetooth radio access technology, and wherein the handover operation comprises a Bluetooth pairing operation.

20. The apparatus of claim 16, wherein, to determine that the audio configuration information for the audio playback device is available, the at least one processor is configured to determine that the apparatus has a default audio configuration for audio playback devices.

21. The apparatus of claim 20, wherein the at least one processor is further configured to:
    receive identification information from the audio playback device, and wherein the at least one processor is configured to determine that the apparatus has the audio configuration information for the audio playback device based on the received identification information.

22. The apparatus of claim 16, wherein the at least one processor is further configured to receive an indication that the audio playback device can receive the audio configuration information.

23. An apparatus for audio playback, the apparatus comprising:
    at least one memory; and
    at least one processor coupled to the at least one memory, the at least one processor being configured to:
    detect that a first device is in proximity;
    transmit, via a proximity based communications system, an identifier associated with the apparatus;
    receive, in response to the transmitted identifier and via the proximity based communications system, audio configuration information, wherein the audio configuration information includes a set of sound effects for adjusting audio playback; and
    adjust audio playback based on the received audio configuration information.

24. The apparatus of claim 23, wherein the proximity based communications system comprises a near field communications system.

25. The apparatus of claim 23, wherein the at least one processor is further configured to:
receive, via the proximity based communications system, a request for handover information, wherein the handover information comprises information for establishing a connection via a radio access technology;
transmit, via the proximity based communications system, the handover information; and
perform a handover operation.

26. The apparatus of claim 25, wherein the radio access technology includes a Bluetooth radio access technology, and wherein the handover operation comprises a Bluetooth pairing operation.

27. The apparatus of claim 23, wherein the at least one processor is further configured to transmit identification information to the first device.

28. The apparatus of claim 23, wherein the at least one processor is further configured to transmit an indication that the apparatus can receive the audio configuration information.

29. The apparatus of claim 28, wherein the at least one processor is further configured to:
receive the audio configuration information;
determine that a sound effect corresponding to one or more sound effects in the received audio configuration information cannot be adjusted;
determine an additional sound effect that may be adjusted; and
adjust the additional sound effect based on the sound effect in the received audio configuration information.

30. The apparatus of claim 28, wherein the at least one processor is further configured to:
receive the audio configuration information;
determine that a sound effect corresponding to one or more sound effects in the received audio configuration information cannot be adjusted based on the sound effect in the received audio configuration information; and
provide an indication that the one or more sound effects cannot be adjusted based on the sound effect in the received audio configuration information.

* * * * *